(12) United States Patent
Treuhaft

(10) Patent No.: US 9,661,108 B2
(45) Date of Patent: *May 23, 2017

(54) PER-REQUEST CONTROL OF DNS BEHAVIOR

(71) Applicant: Cisco Technology, Inc., San Jose, CA (US)

(72) Inventor: Noah Treuhaft, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 434 days.

This patent is subject to a terminal disclaimer.

(21) Appl. No.: 14/263,405

(22) Filed: Apr. 28, 2014

(65) Prior Publication Data

US 2014/0237139 A1  Aug. 21, 2014

Related U.S. Application Data

(63) Continuation of application No. 12/335,432, filed on Dec. 15, 2008, now Pat. No. 8,713,188.

(60) Provisional application No. 61/013,367, filed on Dec. 13, 2007.

(51) Int. Cl.
  *G06F 15/16* (2006.01)
  *H04L 29/06* (2006.01)
  *H04L 29/12* (2006.01)

(52) U.S. Cl.
  CPC ........ *H04L 69/22* (2013.01); *H04L 29/12066* (2013.01); *H04L 61/1511* (2013.01); *H04L 63/1441* (2013.01); *H04L 63/1483* (2013.01)

(58) Field of Classification Search
  CPC ...................... H04L 29/12066; H04L 61/1511
  USPC ................................ 709/229, 200, 203, 224
  See application file for complete search history.

(56) References Cited

U.S. PATENT DOCUMENTS

| | | |
|---|---|---|
| 6,411,966 B1 | 6/2002 | Kwan et al. |
| 6,526,450 B1 | 2/2003 | Zhang et al. |
| 6,643,707 B1 | 11/2003 | Booth |
| 6,760,746 B1 | 7/2004 | Schneider |
| 6,845,400 B2 | 1/2005 | Macpherson et al. |
| 6,880,007 B1 | 4/2005 | Gardos et al. |
| 6,976,090 B2 | 12/2005 | Ben-Shaul et al. |
| 7,103,645 B2 | 9/2006 | Leighton et al. |
| 7,194,522 B1 | 3/2007 | Swildens et al. |
| 7,225,272 B2 | 5/2007 | Kelley et al. |
| 7,228,359 B1 | 6/2007 | Monteiro |
| 7,280,999 B2 | 10/2007 | Chung et al. |
| 7,313,631 B1 | 12/2007 | Sesmun et al. |
| 7,328,281 B2 | 2/2008 | Takeda et al. |
| 7,334,048 B1 | 2/2008 | Guan et al. |
| 7,334,049 B1 | 2/2008 | Somasundaram et al. |
| 7,406,538 B2 | 7/2008 | Berg |

(Continued)

OTHER PUBLICATIONS

Response to Office Action dated Mar. 9, 2016, U.S. Appl. No. 14/075,868, filed Nov. 8, 2013.

(Continued)

*Primary Examiner* — El Hadji Sall

(57) ABSTRACT

In various embodiments, a user or subscriber of a domain name system (DNS) service that provides various DNS resolution options or features, such as misspelling redirection, parental filters, domain blocking, or phishing protection through the DNS process, can influence how requests for domain name (DNS) information are handled on a per-request basis. The user or subscriber may configure the DNS client software of their personal computer or configure their broadband router to provide control information to a DNS server with DNS resolution options that enables the DNS server to resolve DNS queries with the DNS resolution options on a per-request basis. As a result, the user can mitigate exposure to pop-ups, pop-unders, banner ads, fraudulent offers, malware, viruses, or the like, from websites using the domain name system.

20 Claims, 8 Drawing Sheets

(56) References Cited

U.S. PATENT DOCUMENTS

| | | |
|---|---|---|
| 7,426,576 B1 | 9/2008 | Banga et al. |
| 7,502,923 B2 | 3/2009 | Poyhonen et al. |
| 7,550,985 B2 | 6/2009 | Brunelle |
| 7,831,697 B2 | 11/2010 | Fukushima |
| 7,840,699 B2 | 11/2010 | Fujita et al. |
| 8,082,451 B2 | 12/2011 | Waris |
| 8,171,019 B2 | 5/2012 | Balogh |
| 8,385,964 B2 | 2/2013 | Haney |
| 8,606,926 B2 | 12/2013 | Ulevitch |
| 2002/0027915 A1 | 3/2002 | Foti et al. |
| 2002/0035639 A1 | 3/2002 | Xu |
| 2004/0039798 A1 | 2/2004 | Hotz et al. |
| 2004/0044791 A1 | 3/2004 | Pouzzner |
| 2004/0250119 A1 | 12/2004 | Shelest et al. |
| 2005/0010653 A1 | 1/2005 | McCanne |
| 2005/0198386 A1 | 9/2005 | Accapadi et al. |
| 2006/0062202 A1 | 3/2006 | Oesterling et al. |
| 2007/0011168 A1 | 1/2007 | Keohane et al. |
| 2007/0061456 A1 | 3/2007 | Waris |
| 2007/0118669 A1 | 5/2007 | Rand et al. |
| 2007/0180090 A1 | 8/2007 | Fleischman et al. |
| 2007/0204040 A1 | 8/2007 | Cox |
| 2008/0288470 A1* | 11/2008 | Goutard ............ H04L 29/12009 |
| 2009/0157889 A1 | 6/2009 | Treuhaft |
| 2010/0145771 A1 | 6/2010 | Fligler et al. |
| 2012/0005753 A1 | 1/2012 | Provos et al. |
| 2012/0023568 A1 | 1/2012 | Cha et al. |
| 2012/0066203 A1 | 3/2012 | Robert |

OTHER PUBLICATIONS

Godin, Seth, "Oopstr," Article on "seth godin's blog" at http://sethgodin:typepad.com/seths_blog/2006/05/00-str.html, downloaded from the Internet on Jun. 14, 2006 and indicated as posted on May 28, 2006, 3 page.

Non-final Office Action dated Aug. 18, 2010, U.S. Appl. No. 12/335,432, filed Dec. 15, 2008.

Response to Office Action dated Feb. 18, 2011, U.S. Appl. No. 12/335,432, filed Dec. 15, 2008.

Final Office Action dated Apr. 28, 2011, U.S. Appl. No. 12/335,432, filed Dec. 15, 2008.

Response to Office Action dated Oct. 28, 2011, U.S. Appl. No. 12/335,432, filed Dec. 15, 2008.

Notice of Allowance dated Jul. 22, 2013, U.S. Appl. No. 12/335,432, filed Dec. 15, 2008.

Notice of Allowance dated Dec. 4, 2013, U.S. Appl. No. 12/335,432, filed Dec. 15, 2008.

Non-final Office Action dated Oct. 14, 2009, U.S. Appl. No. 11/424,230, filed Jun. 14, 2006.

Response to Office Action dated Apr. 14, 2010, U.S. Appl. No. 11/424,230, filed Jun. 14, 2006.

Final Office Action dated Jul. 8, 2010, U.S. Appl. No. 11/424,230, filed Jun. 14, 2006.

Response to Office Action dated Jan. 10, 2011, U.S. Appl. No. 11/424,230, filed Jun. 14, 2006.

Non-final Office Action dated Aug. 26, 2011, U.S. Appl. No. 11/424,230, filed Jun. 14, 2006.

Response to Office Action dated Feb. 24, 2012, U.S. Appl. No. 11/424,230, filed Jun. 14, 2006.

Final Office Action dated Aug. 8, 2012, U.S. Appl. No. 11/424,230, filed Jun. 14, 2006.

Response to Office Action dated Feb. 8, 2013, U.S. Appl. No. 11/424,230, filed Jun. 14, 2006.

Notice of Allowance dated Aug. 5, 2013, U.S. Appl. No. 11/424,230, filed Jun. 14, 2006.

U.S. Appl. No. 14/075,868, filed Nov. 8, 2013.

Non-final Office Action dated Sep. 25, 2015, U.S. Appl. No. 14/075,868, filed Nov. 8, 2013.

* cited by examiner

PER-REQUEST CONTROL OF DNS BEHAVIOR

CROSS-REFERENCES TO RELATED APPLICATIONS

This application is a continuation application of U.S. patent application Ser. No. 12/335,432, filed Dec. 15, 2008 and entitled "Per-Request Control Of DNS Behavior," which claims priority to and the benefit of U.S. Provisional Patent Application No. 61/013,367, filed Dec. 13, 2007 and entitled "Per-Request Control of DNS Behavior," the entire disclosures of which are herein incorporated by reference for all purposes.

This application is related to U.S. patent application Ser. No. 11/424,230, filed Jun. 14, 2006, and entitled "Recursive DNS Nameserver," published as US 2007/0294419 on Dec. 20, 2007 and issued as U.S. Pat. No. 8,606,926 on Dec. 10, 2013, the entire disclosure of which is herein incorporated by reference for all purposes.

BACKGROUND

Embodiments of the present invention generally relate to communications networks, and more specifically to techniques for controlling DNS behavior on a per-request basis.

The Domain Name System or Domain Name Service (DNS) is a system that stores information, such as Internet Protocol (IP) addresses, associated with domain names. Domain names are names that can be assigned to a computer host or groups of computer hosts. Typically, a domain name is made up of alphabetic characters and is easier to remember than a numeric IP address assigned to a computer host. The computer host or groups of computer hosts often provides network services such as web servers, email servers, application servers, and the like, accessible using the domain name.

Whenever an application uses a domain name when requesting network services, a DNS nameserver receives the request and translates the domain name into the corresponding IP address. For example, the domain name "www.cnet.com" might translate to 216.239.115.141. For any group of computer hosts in the DNS system there is likely to be a single master list of domain names and associated IP addresses. The group of computer hosts is called a zone. A zone could be a generic top-level domain (gTLD), such as "com," or a department within a company or university. Within the zone, DNS service for subsidiary zones may be delegated. The DNS nameserver that maintains the master list for the zone is said to have authority for that zone and is called an authoritative DNS nameserver.

With the ubiquity of the Internet and other Internet Protocol (IP) networks, users, corporations, educational and governmental organizations are constantly seeking ways to take beneficial advantage of opportunities on the Internet. Attempts also have been made to avoid and mitigate negative aspects of these, such as information theft and identify theft, fraud, pornography, and other insensitive and context inappropriate material. Thus, some solutions prevent or block access to such material before the material arrives at a user's computer using the DNS system. However, this can be difficult due to the dynamic nature of the Internet.

Accordingly, what is desired are improved methods and apparatus for solving some of the problems discussed above, while reducing further drawbacks, some of which are discussed above.

BRIEF SUMMARY

In various embodiments, a user or subscriber of a domain name system (DNS) service that provides various DNS resolution options or features, such as misspelling redirection, parental filters, domain blocking, or phishing protection through the DNS process, can influence how requests for domain name (DNS) information are handled on a per-request basis. The user or subscriber may configure the DNS client software of their personal computer or configure their broadband router to provide control information to a DNS server with DNS resolution options that enables the DNS server to resolve DNS queries with the DNS resolution options on a per-request basis. As a result, the user can mitigate exposure to pop-ups, pop-unders, banner ads, fraudulent offers, malware, viruses, or the like, from websites using the domain name system. Additionally, rather than relying on settings and/or preferences for controlling DNS resolution that are associated with the IP address of an entire corporate or home network, DNS resolution may be controlled on a per-request basis for each individual user or device.

In one embodiment, for resolving domain name system (DNS) queries, a DNS query is received from a first computer system at a second computer system configured to resolve DNS queries. The DNS query can include control information provided by the first computer system that enables the second computer system to identify whether to use one or more options when resolving the DNS query. A domain name and the control information can be parsed from the DNS query with the second computer system. An IP address can be determined with the second computer system using at least one of the one or more options for resolving DNS queries based the domain name and the control information. A DNS response for the DNS query can be generated with the second computer system using the determined IP address.

In some embodiments, the DNS query may be received with the control information encoding settings associated with the one or more options. The control information may encode whether the one or more options are enabled or disabled. The DNS query may be received with the control information encoding information identifying a subscriber. The control information then may encode an index specifying a location of one or more preferences provided by the subscriber for resolving domain names into IP addresses using the one or more options.

In further embodiments, the IP address may be determined with the second computer system using the at least one of the one or more options based the domain name and the control information by identifying a setting in the control information for the at least one of the one or more options. The IP address may be resolved based on the domain name and the setting of the at least one option. Identifying the setting in the control information for the at least one option may include identifying a setting for at least one of a malformed domain name option, a proxy option, a security option, a phishing option, a parental filter option, a lingerie option, a mature option, nudity option, a pornography option, or a sexuality option.

In still further embodiments, the IP address may be determined with the second computer system using the at least one of the one or more options based the domain name and the control information by identifying one or more preferences using the control information. The one or more preferences may be provided by a subscriber for resolving domain names into IP addresses using the one or more options. An IP address may be resolved based on the domain name and the one or more preferences for the one or more options.

In one embodiment, the DNS response may be sent to the first computer system from the second computer system. An application may use an IP address specified in the DNS response that is different from an IP address corresponding to or actually associated with the domain name.

A further understanding of the nature, advantages, and improvements offered by those innovations disclosed herein may be realized by reference to remaining portions of this disclosure and any accompanying drawings.

BRIEF DESCRIPTION OF THE DRAWINGS

In order to better describe and illustrate embodiments and/or examples of any innovations presented within this disclosure, reference may be made to one or more accompanying drawings. The additional details or examples used to describe the one or more accompanying drawings should not be considered as limitations to the scope of any of the disclosed inventions, any of the presently described embodiments and/or examples, or the presently understood best mode of any innovations presented within this disclosure.

DETAILED DESCRIPTION

The Internet, and other communications networks, can provide users access to information and services. In addition to standard or traditional services, such as e-mail and domain name services, some users may employ add-ons, plug-ins, or other specialized services to complement their on-line experience.

A domain name system (DNS) server configured to resolve requests for domain name information may be able to identify a DNS client. One example of this type of DNS service is provided by OpenDNS, Inc. of San Francisco, Calif. (hereinafter "OpenDNS"). In addition to determining an IP address for a domain name, DNS servers operated by OpenDNS may use one or more DNS resolution options, filters, features or other techniques for determine what IP address to resolve for a given domain name. For example, in providing DNS services to the DNS client, the DNS servers may provide resolved domain name information or redirect the DNS client to another location based on subscriber information stored at the DNS servers that indicates how an end user wants the DNS servers to employ the DNS resolutions options or features.

In various embodiments, a user or subscriber of a domain name system (DNS) service that provides various DNS resolution options or features, such as misspelling redirection, parental filters, domain blocking, or phishing protection through the DNS process, can influence how requests for domain name (DNS) information are handled on a per-request basis. The user or subscriber may configure the DNS client software of their personal computer or configure their broadband router to provide control information to a DNS server with DNS resolution options that enables the DNS server to resolve DNS queries with the DNS resolution options on a per-request basis. As a result, the user can mitigate exposure to pop-ups, pop-unders, banner ads, fraudulent offers, malware, viruses, or the like, from websites using the domain name system. Additionally, rather than relying on settings and/or preferences for controlling DNS resolution that are associated with the IP address of an entire corporate or home network, DNS resolution may be controlled on a per-request basis for each individual user or device.

Figure 1:
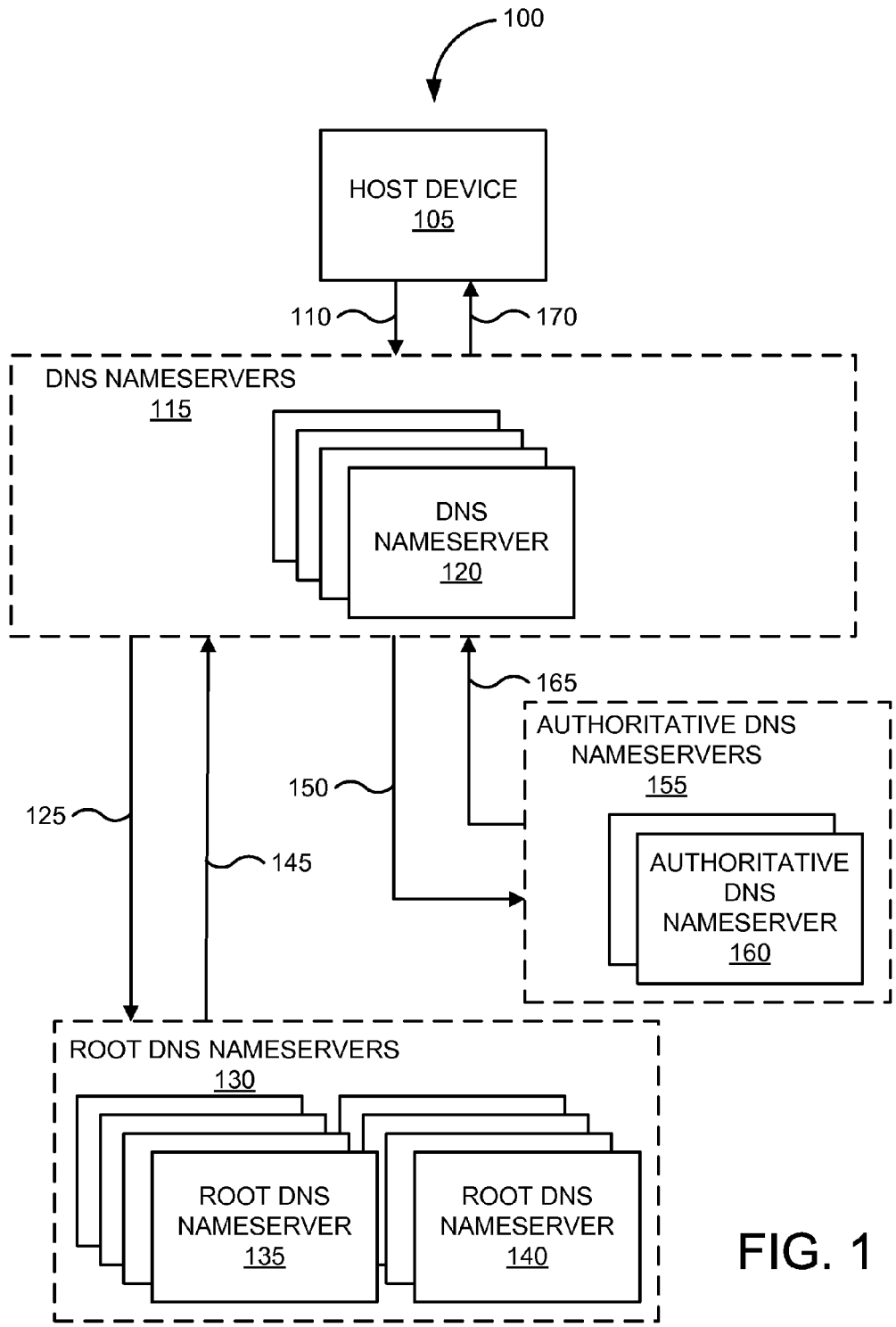
FIG. 1 is a block diagram illustrating processing of a DNS request in one embodiment according to the present invention.

FIG. 1 illustrates processing of a DNS request using DNS system 100 in one embodiment according to the present invention. In this example, host device 105 makes DNS query 110, for example for the IP address of the domain name "www.cnet.com," to a set of DNS nameservers 115. Host device 105 may be a personal computer, laptop, workstation, cell phone, PDA, embedded device, router, gateway, network device, or the like. Host device 105 may include software and/or hardware elements configured to receive a request for domain name information from one or more applications and generate DNS query 110. For example, host device 105 may be a laptop that executes DNS client software responsive to web browsers, e-mail clients, instant messaging clients, or the like, to generate DNS query 110. In another example, host device 105 may be an embedded device, such as a hardware router, that acts as a DNS forwarder or DNS cache to other network devices and generates DNS query 110 in response to DNS requests from the other network devices.

DNS nameserver 120, which is part of DNS nameservers 115, may service DNS query 110. DNS nameserver 120 may be embodied as a recursive DNS nameserver thereby communicating with one or several upstream DNS nameservers (e.g., root DNS nameservers 130) to resolve DNS requests. In general, DNS nameserver 120 may attempt to resolve DNS query 110 from information stored in a local cache. Such a local cache may be shared by the set of nameservers 115. DNS nameserver 120 may maintain the local cache with domain name records that have already been resolved to improve performance in responding to subsequent DNS requests.

In various embodiments, DNS nameserver 120 can be configured to service DNS query 110 using one or more options for resolving DNS queries. Each of the options for resolving DNS queries may determine whether the domain name identified in a query satisfies one or more criteria. For example, a particular option, filter, or feature may determine whether the domain name hosts or is otherwise categorized as an adult web site, a potential phishing or pharming site, and a website whose content has been deemed inappropriate by the user or containing material illegal in the country of the user. If the criteria are satisfied, DNS nameserver 120 may generate a DNS response that includes an IP address that is different from the TP address corresponding to the domain name. Therefore, the use may see a warning page or the like informing the user that an option has been applied.

In some embodiments, a user or subscriber of the OpenDNS service may set one or more preferences or selections for how the options are to be enabled or otherwise applied when DNS nameserver 120 resolves DNS queries associated with the user. Preferences or settings for a user or subscriber may be stored as subscriber information at DNS nameserver 120 or in one or more storage devices accessible to DNS nameserver 120. Upon identifying the user, subscriber information associated with the user may be used to alter the IP address in a DNS response that the user receives. For example, a user or subscriber may establish subscriber information that instructs DNS nameserver 120 to alter responses to DNS requests that are associated with adult web sites, potential phishing or pharming sites, and other sites deemed inappropriate by the user or containing material illegal in the country of the user.

In further embodiments, a user or subscriber of the OpenDNS service may establish per-request control of the DNS resolution process. Control information may be stored at host device 105 that enables DNS nameserver 120 to identify which options are to apply or where to find subscriber information. Therefore, the user may control DNS resolution options on a per-request basis.

Returning to FIG. 1, if DNS nameserver 120 is not able to locally resolve DNS query 110, DNS nameserver 120 can send DNS request 125 to root DNS nameservers 130. Root DNS nameservers 130, such as in the case of the Internet, are responsible for defining points of delegation in top level domains, such as "com," "edu," and "net." Root DNS nameservers 130 can include multiple DNS nameservers 135 and 140 that perform this function by providing DNS response 145 with information that points DNS nameserver 120 to authoritative DNS nameservers 155. For example, DNS nameserver may be directed to request domain name information from authoritative DNS nameservers 155 for the domain name "cnet.com."

DNS nameserver 120 then responds to the information in DNS response 145 by sending DNS request 150 to authoritative DNS nameserver 160 for the domain name "www.cnet.com." Authoritative DNS nameserver 160 can then resolve DNS request 150 for the domain name "www.cnet.com" and return DNS response 165 to DNS nameserver 120 with the IP address of the computer host(s) at "www.cnet.com." DNS nameserver 120 may cache DNS response 165 in the local cache for future use.

At this point, or when DNS nameserver 120 finds a requested domain name record in the local cache, DNS nameserver 120 determines how to respond to host device 105. In various embodiments, host device 105 provides control information along with DNS query 110 to DNS nameserver 120 that enables DNS nameserver 120 to determine whether to employ any of the options available for resolving DNS queries. DNS nameserver 120 can determine an IP address to provide for the request domain name using one or more or none of the options. DNS nameserver 120 then can respond with a domain name record including the determined IP address to host device 105. DNS nameserver 120 may respond with the IP address of "www.cnet.com" in DNS response 170 or may respond with another IP address that, for example, redirects the user to a website with additional information for the reason why the corresponding IP address was not returned.

Figure 2:
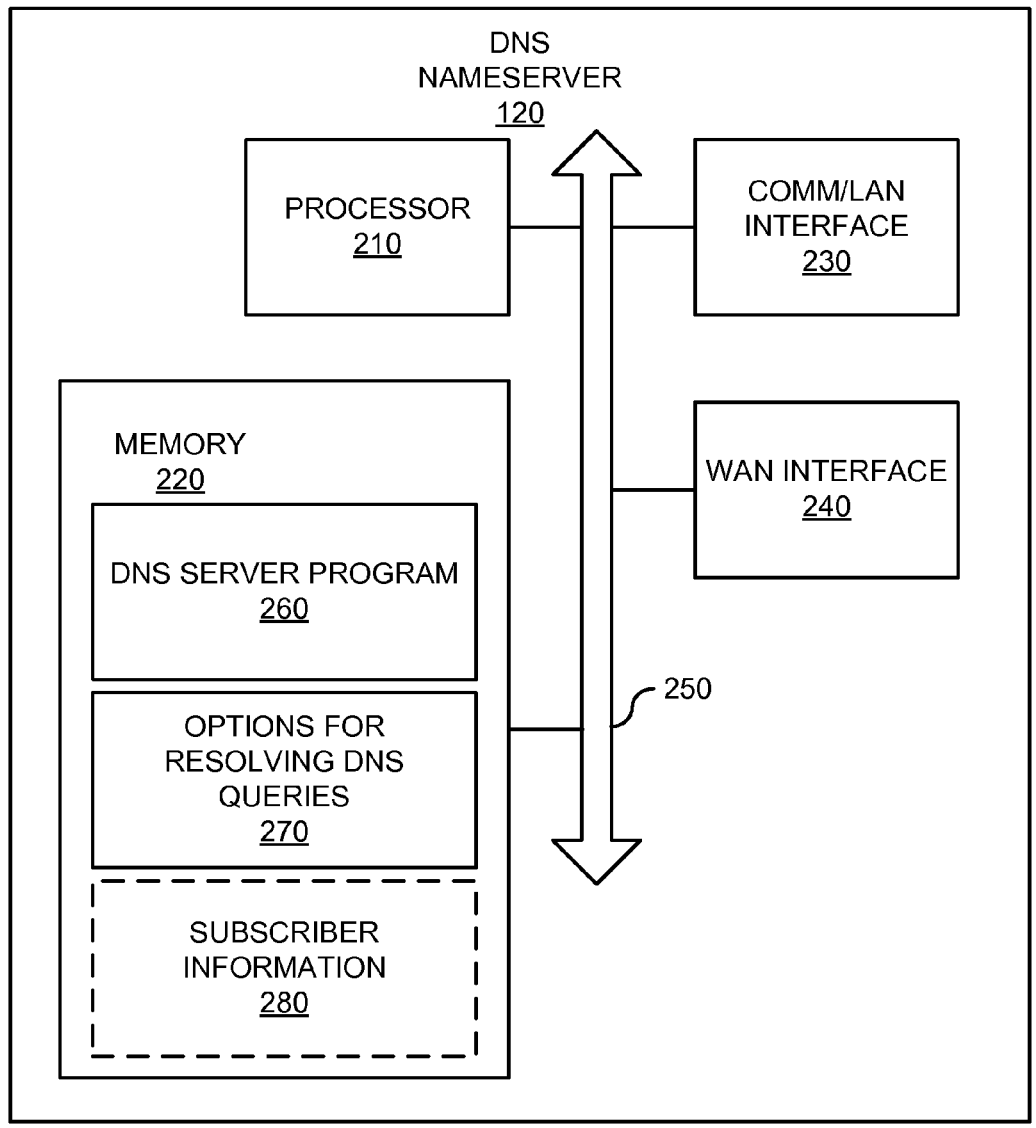
FIG. 2 is a block diagram of a DNS nameserver in one embodiment of the present invention.

FIG. 2 is a block diagram of DNS nameserver 120 in one embodiment of the present invention. In this example, DNS nameserver 120 can include processor 210, memory 220 communications/local area network (LAN) interface 230, wide area network (WAN) interface 240, and system bus 250. Processor 210, memory 220, LAN interface 230, and WAN interface 240 can be communicatively coupled via bus 260.

DNS nameserver 120 may be embodied as a PC, a workstation, a mainframe, a server, a laptop, an embedded device, a server farm, a cluster, a grid, or the like. DNS nameserver 120 may include hardware and/or software elements configured to resolve DNS queries. For example, memory 220 may include DNS server program 260 and options for resolving DNS queries 270. In some embodiments, memory 220 may optionally include subscriber information 280.

Options 270 may include software programs or modules configured to provide information about a domain name. For example, a malformed option may take as input a malformed or misspelled domain name and return the correctly spelled domain name or the IP address of the domain name that approximates the malformed domain name. In another example, a phishing option may take as input a domain name and consult one or more database to determine whether the domain name has been classified as a domain hosting fraudulent information, malware, viruses, or the like. If the domain name has been classified as containing malware or the like, the phishing option may have DNS nameserver 120 return the IP address of a different website thereby disallowing the user from accessing sites by the domain name or the IP address of a security website that cautions the user about the domain name and gives the user the option to proceed. In yet another example, a classification option may take a domain name as input and determine whether the domain name has been classified according to one or more user preferences or parental filters, such as disallowing sites that contain nudity, undesirable language, sexual content, or restricting access to foreign sites.

In operation, DNS nameserver 120 receives DNS queries from clients and network devices and generates DNS response based on the queries. In one embodiment, the DNS queries may be resolved by DNS nameserver 120 using the IP address of the originator. In another embodiment, DNS nameserver 120 may be configured to resolve DNS queries based on subscriber information 280. In further embodiments, DNS nameserver 120 may be configured to resolve DNS queries based on control information encoded in the DNS queries that enables the DNS nameserver 120 to determine whether to apply one or more of options 270. The control information may specify which options are to apply, a user or subscriber identifier, a device identifier, or the like, that may based to determine whether one or more of options 270 apply or are enabled/disabled.

Figure 3:
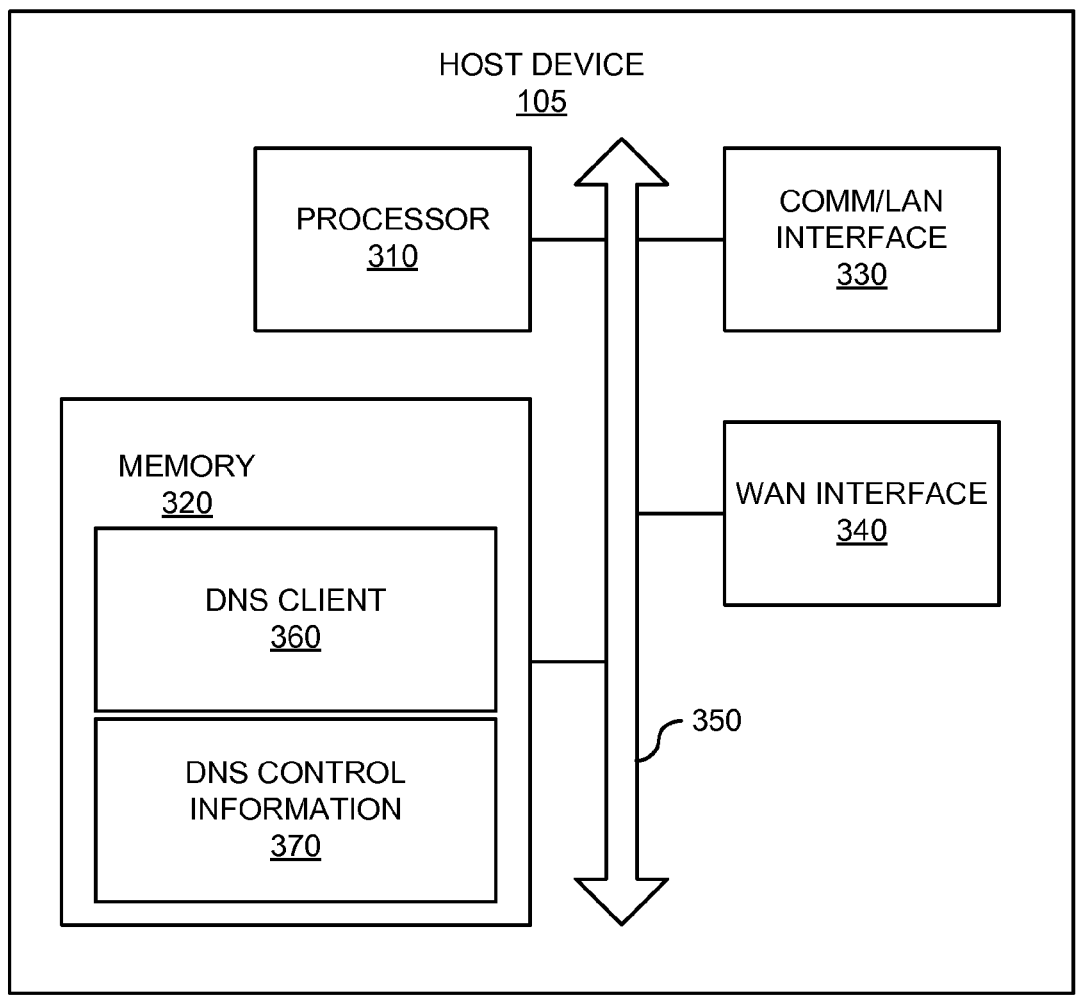
FIG. 3 is a block diagram of a host device in one embodiment of the present invention.

FIG. 3 is a block diagram of host device 105 in one embodiment of the present invention. In this example, host device 105 can include processor 310, memory 320 communications/local area network (LAN) interface 330, optionally wide area network (WAN) interface 340, and system bus 350. Processor 310, memory 320 LAN interface 330, and WAN interface 340 can be communicatively coupled via bus 360.

Host device 105 may be embodied as a personal computer or laptop, or as a dedicated hardware device. In various embodiments, host device 105 may be embodied as a broadband router, such as the WRT54G from Linksys, Inc. of Irvine, Calif. Host device 105 may include hardware and/or software elements configured to generate DNS queries. For example, memory 220 may include DNS client program 260 and DNS control information 270.

Because an IP address associated with host device 105 may dynamically change, DNS nameserver 120 may not conveniently use the IP address of host device 105 to resolve DNS queries using options 270. Accordingly, in various embodiments, host device 105 may generate DNS queries using DNS control information 270. For example, host device 105 may encode within a DNS query one or more attributes or settings that enable or disable one or more of options 270. In another example, host device 105 may encode within a DNS query an identifier, such as an account ID or index, that specifies where DNS nameserver 120 can find the preferences or subscriber information used by options 270.

Figure 4:
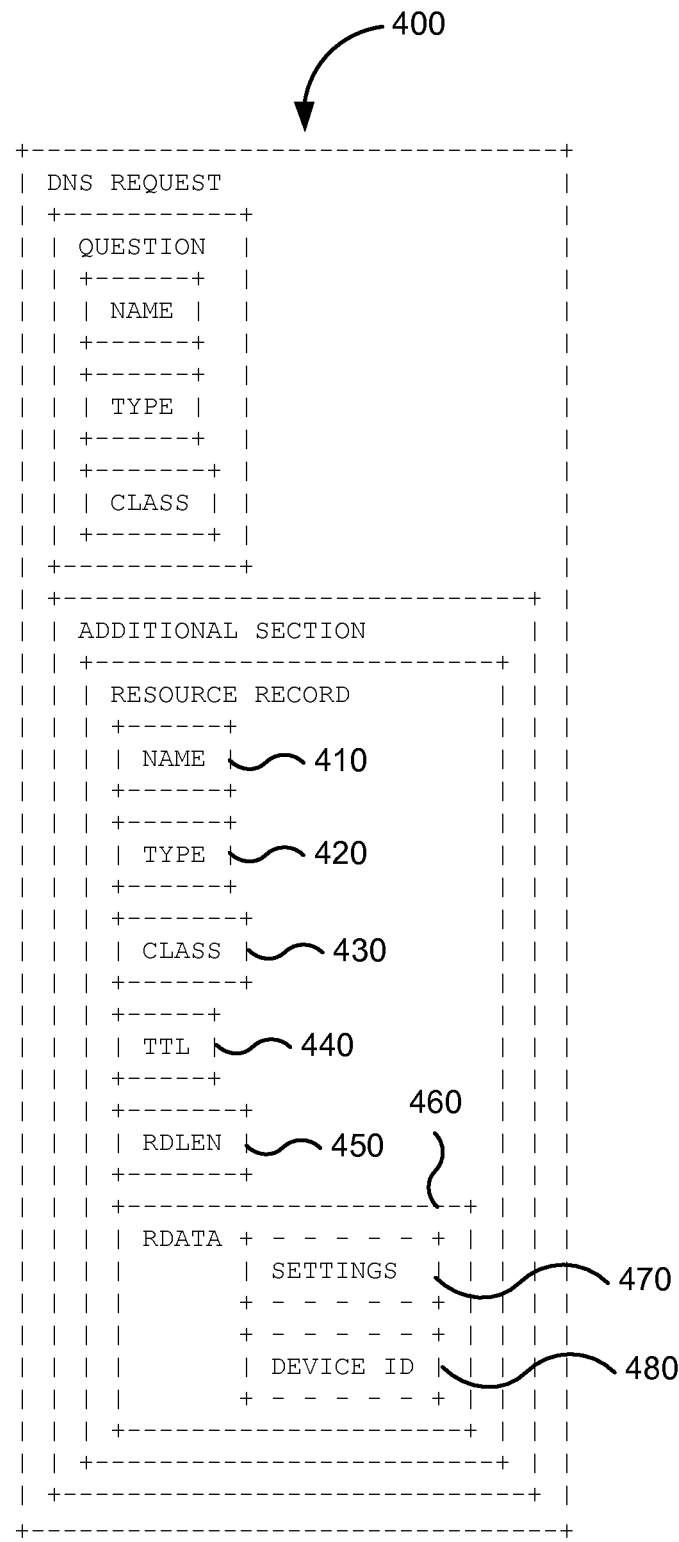
FIG. 4 is a block diagram illustrating a DNS request used in various embodiments of the present invention.

FIG. 4 is a block diagram illustrating DNS request 400 used in various embodiments of the present invention. In this example, DNS request 400 can a typical question data section (e.g., a name field, a type field, and a class field) and an additional section. The additional data section can include a resource record (RR) having name field 410, type field 420, class field 430, TTL field 440, RDLEN field 450, and RDATA field 460.

In various embodiments, an extension of the DNS protocol called EDNS allows more flags, label types and return codes to be defined. EDNS may allow the sender of a DNS message (e.g., host device 105) to advertise its own extended capabilities to the message receiver (e.g., DNS nameserver 120). This may be accomplished through the inclusion of an OPT pseudo-RR in the additional data section of a request or response. The OPT pseudo-RR may include one or more EDNS options.

In some embodiments, host device 105 can define a new EDNS option called CLIENTID for control of user, device, or vendor-specific DNS server behavior. The CLIENTID option may appear in an OPT pseudo-RR in the additional data section of a request. In general, a CLIENTID option applies to the DNS request that it accompanies. Thus, the CLIENTID can allow a per-request control of each DNS message.

In various embodiments, an organization associated with DNS nameserver 120 may provide one or more values for the CLIENTID option. In this example, DNS request 400 can include settings 470, each setting or attribute corresponding to a particular level of DNS control (e.g., level of adult site blocking, level of malicious web site detection, etc.).

The CLIENTID options may be structured structured as follows:

| Field Name | Field Type | Description |
|---|---|---|
| OPTION-CODE | u_int16_t | CLIENTID (4) |
| OPTION-LENGTH | u_int16_t | size (in octets) of OPTION-DATA |
| OPTION-DATA | octet stream | specified by the organization |

In one example, the last octet of an encoding may be used as flag bits specifying categories to be blocked. One correspondence between bits and categories can be as follows:

```
#define CATEGORY_lingerie (1 << 0)
#define CATEGORY_mature (1 << 1)
#define CATEGORY_nudity (1 << 2)
#define CATEGORY_porn (1 << 3)
#define CATEGORY_proxy (1 << 4)
#define CATEGORY_sexuality (1 << 5)
#define CATEGORY_tasteless (1 << 6)
```

In other embodiments, host device 105 can supply a device ID to DNS nameserver 120 by including DEVICE ID 480. For example, a DEVICE ID resource record (RR) may be provided in the additional section of a DNS query. The RR can appear in the DNS query's additional section and may be structured as follows:

| Field Name | Field Type | Field Value |
|---|---|---|
| NAME | domain name | organization domain name |
| TYPE | u_int16_t | DEVICEID value |
| CLASS | u_int16_t | IN (1) |
| TTL | u_int32_t | 0 |
| RDLEN | u_int16_t | 8 |
| RDATA | device ID | 8-octect device ID |

This can cause DNS nameserver 120 to interpret the last eight octets as a device ID. The device ID can act as an index into a database of subscriber information associated with DNS nameserver 120.

Accordingly, DNS queries may be resolved on a per-request basis independent of the IP address from which a DNS query was received. Therefore, DNS nameserver 120 does not need to know the IP address of the network device that sent the DNS query to apply a user's preferences or settings for any given DNS resolution option, filter, feature or technique provided by DNS nameserver 120.

Figure 5A:
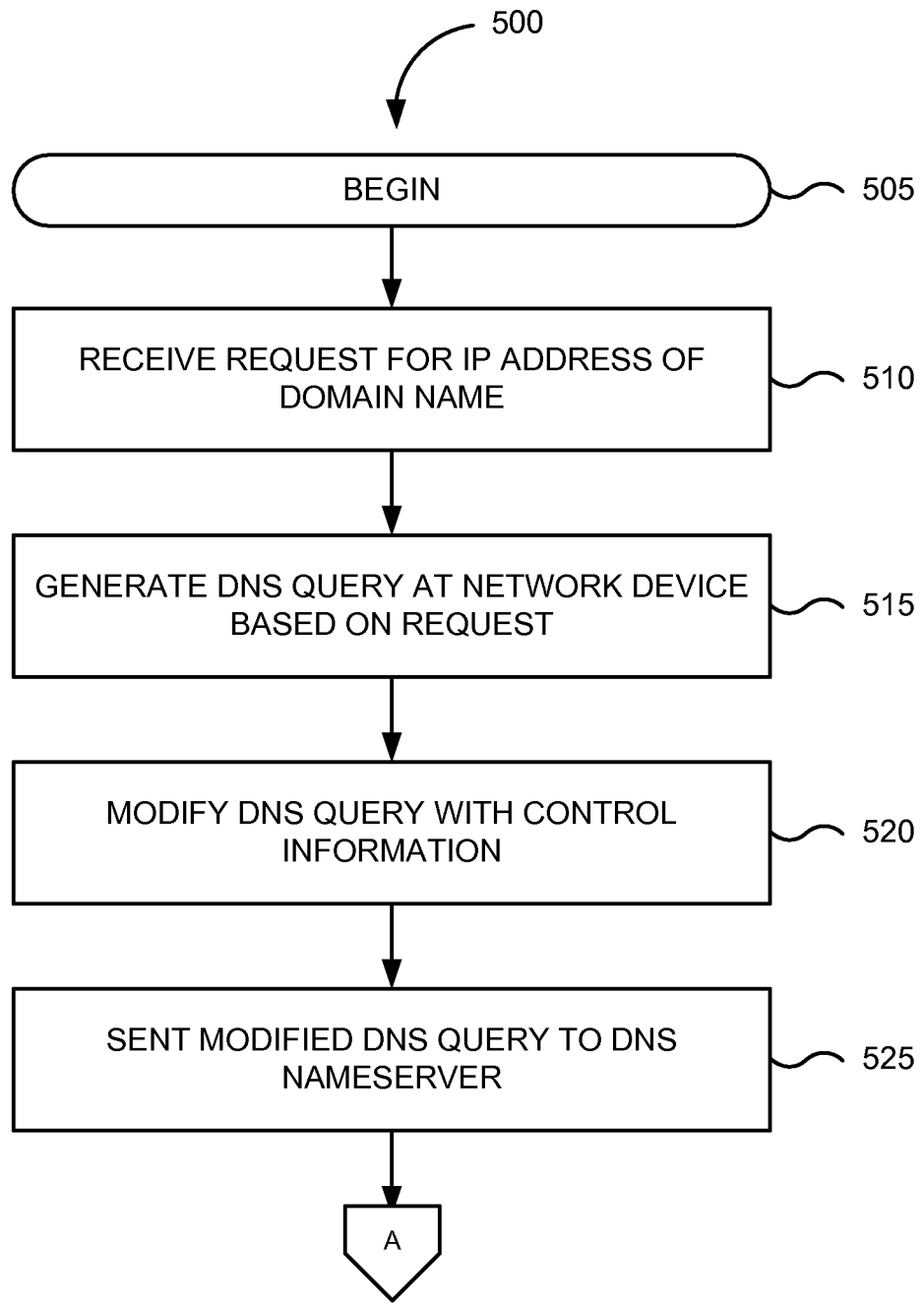
FIGS. 5A, 5B, and 5C are a flowchart of a method for providing per-request control of DNS behavior in one embodiment according to the present invention.
Figure 5B:
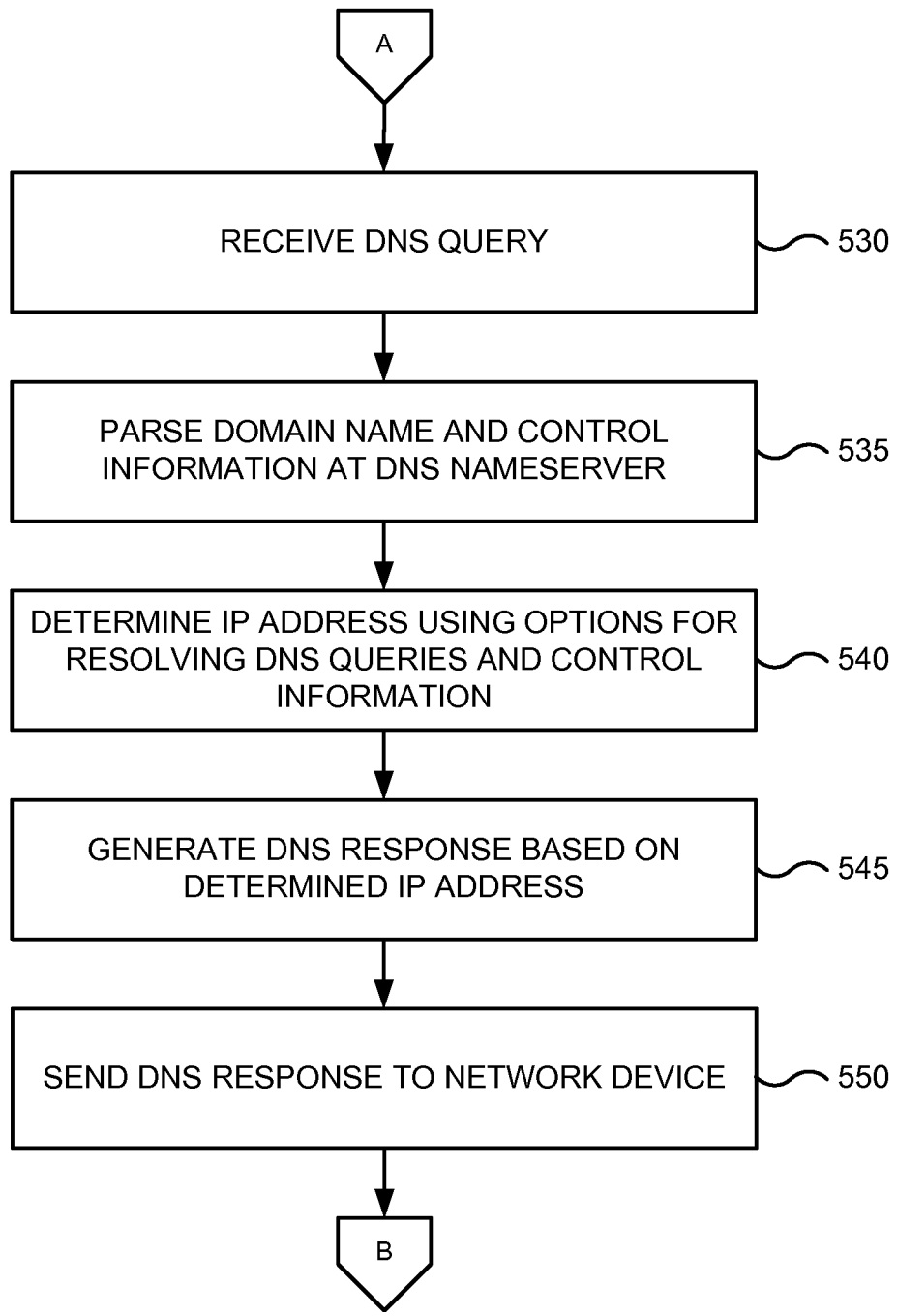
Figure 5C:
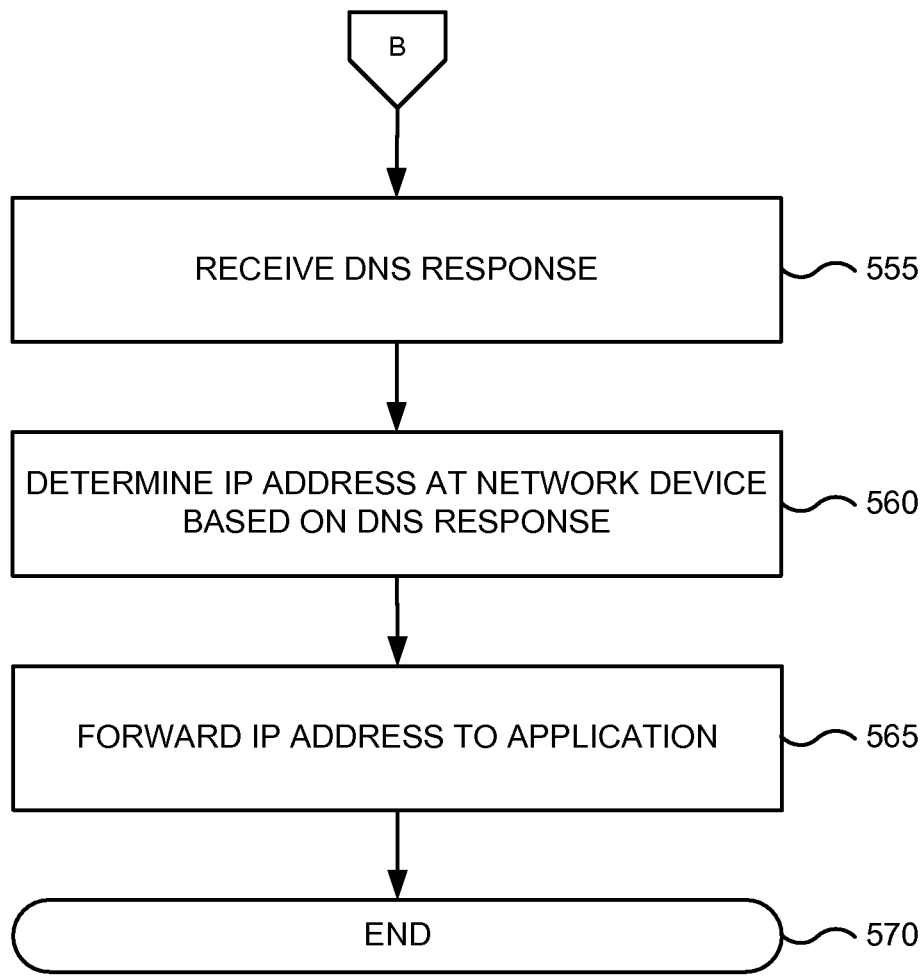

FIGS. 5A, 5B, and 5C are a flowchart of method 500 for providing per-request control of DNS behavior in one embodiment according to the present invention. The processing depicted in FIGS. 5A, 5B, and 5C, may be performed by software modules (e.g., instructions or code) executed by a processor of a computer system, by hardware modules of the computer system, or combinations thereof. FIG. 5A begins in step 505.

In step 510, a request for an IP address of a domain name is received. For example, a web browser may request the IP address of a domain name associated with a URL provided by a user. In step 515, a DNS query is generated at a network device based on the request. Some examples of the network device may include host device 105 of FIG. 1, PC, a workstation, a router, an access point, a gateway, or the like.

In step 520, the DNS query is modified with control information. The control may be stored at the network device or at another device. The control information can include information that enables a domain name service to apply one or more DNS resolution options or features to the DNS query. Rather than rely on the network address of a network device (e.g., an IP address of the network device) for applying DNS resolution options, the control information enables the domain name servers to identify which options or features to apply.

In various embodiments, the DNS query may be encoded with settings for DNS resolutions options or features that indicate whether one or more of the DNS resolution options or feature are to be enabled when resolving domain names. For example, as shown in FIG. 4, an encoding may be used as flag bits specifying categories to be blocked. A correspondence may be maintained by the domain name service between bits and categories.

In some embodiments, the DNS query may be encoded with an identifier that enables the domain name service to retrieve subscriber information. The subscriber information can include preferences or other settings for how a user or subscriber wishes to control domain name resolution within the DNS resolution features. The identifier may include a subscriber identifier, a device identifier, or the like. The identifier may further include index information that enables the domain name service to retrieve subscriber information for the user or subscriber associated with the index identifier.

In various embodiments, a user may interact with a set of administrative web pages hosted by the network device to configure the network device to request DNS information from DNS nameserver 120. The user may specify the control information on a web page. For example, the user may specify which of options 270 of FIG. 2 should be enabled/disable and any attributes, settings, or other criteria that should apply. In other embodiments, the user may specify a username/password or other account identification information for a service providing options 270 as the control information. In another example, once a username/password is provided, the control information can be downloaded to the network device from an external source.

In further embodiments, the DNS query may be received at another network device, such as a router, from the network device on a local area network. For example, the network device may be configured to use the router as a network gateway and as a DNS server. The router may act as a DNS forwarder and DNS cache for clients on the local area network. Before forwarding the DNS query, the router may modify the DNS query with the control information.

In step 525, the modified DNS query is sent to a DNS nameserver. For example, the modified DNS query may be sent to DNS nameserver 120. Method 500 continues in step 530 of FIG. 5B.

Referring to FIG. 5B, in step 530, the DNS query is received. In step 535, the DNS query is parsed or otherwise processed at the DNS nameserver to determine the domain name and the control information. For example, DNS nameserver 120 may determine whether one or more flag bits are set or whether the DNS query includes an identifier for retrieving subscriber information.

In step 540, an IP address is determined using one or more DNS resolution options or features and the control information. In one example, the domain name is resolved to its corresponding IP address. DNS nameserver 120 may make a decision whether to use the corresponding IP address or another IP address when generating a DNS response based on applying one or more DNS resolution options or features. DNS nameserver 120 may determine to substitute the IP address of a website that provides information why the domain name is being block, forwarded, filtered, or otherwise includes material the user has expressed a desire to control.

In step 545, a DNS response is generated based on the determined IP address. DNS nameserver 120 may use the corresponding IP address of the domain name or the substitute IP address based on applying one or more of the available DNS resolution options, filters, or features. In step 550, the DNS response is sent to the network device. Method 500 continues in step 555 of FIG. 5C.

Referring to FIG. 5C, in step 555, the DNS response is received. In step 560, an IP address is determined at the network device based on the DNS response. In step 570, the IP address is forwarded to the application. Accordingly, the network device may control how each DNS query is to be resolved on a per-request bases. Rather than relying on the IP address of the network device, that may change from session to session, control information may be encoded into an individual DNS query that enables a DNS nameserver to identify DNS resolution options, filters, or features to apply when resolving the individual DNS query. Method 500 ends in step 575 of FIG. 5C.

Figure 6:
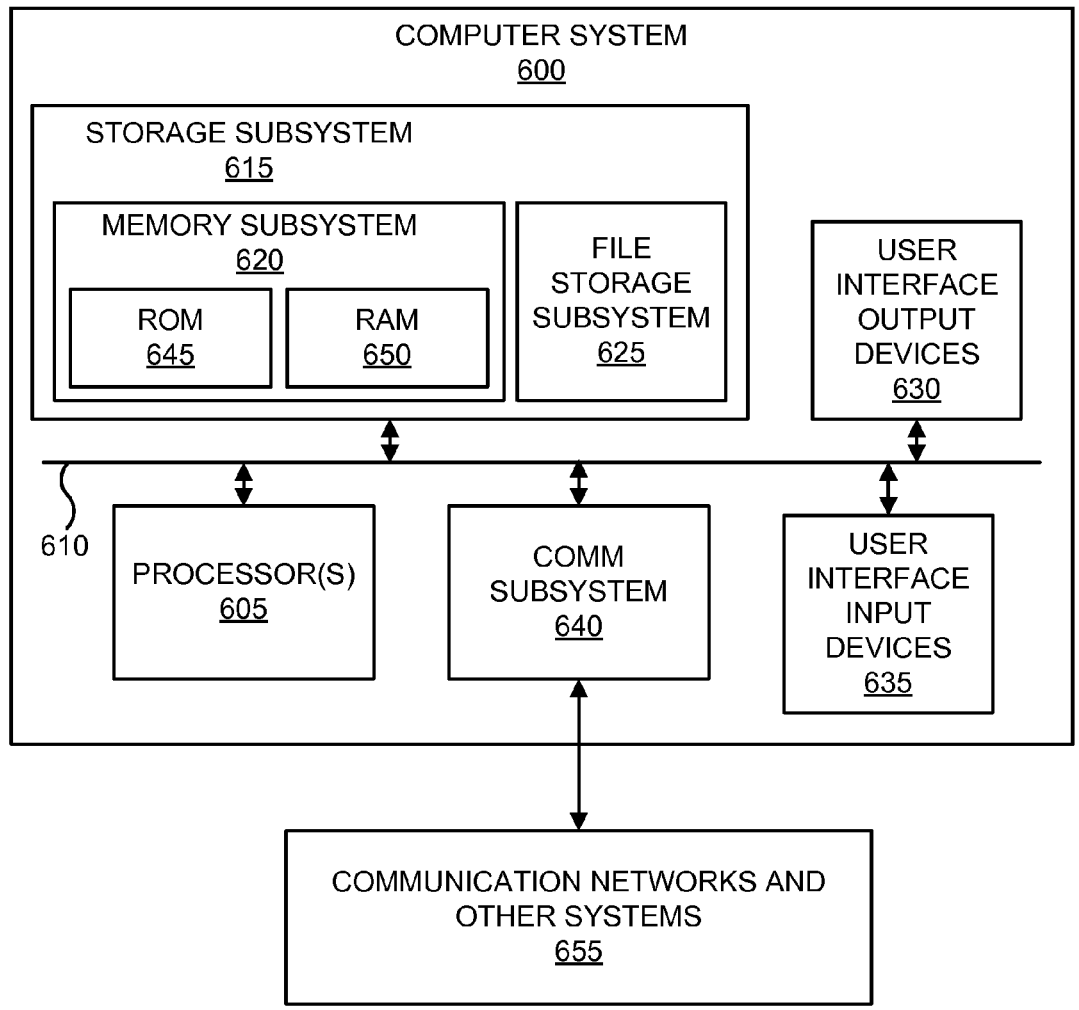
FIG. 6 is a block diagram of a computer system that may incorporate embodiments of the present invention.

FIG. 6 is a block diagram of computer system 600 that may incorporate embodiments of the present invention. In the present embodiment, computer system 600 typically includes one or more processors 605, a system bus 610, storage subsystem 615 that includes memory subsystem 620 and file storage subsystem 625, user interface output devices 630, user interface input devices 635, a communications subsystem 640, and the like.

In various embodiments, computer system 600 typically includes conventional computer components such as the one or more processors 605, and memory storage devices, such as a read only memory (ROM) 645 and random access memory (RAM) 650 in the memory subsystem 620, and disk drives in the file storage subsystem 625.

In the illustrated embodiment, the user interface input devices 635 can comprise a variety of devices including a computer mouse, a trackball, a track pad, a joystick, wireless remote, drawing tablet, voice command system, eye tracking system, and the like. The user interface input devices 635 typically allow a user to select objects, icons, text and the like that appear on the user interface output devices 630 via a command such as a click of a button or the like.

Embodiments of the communication subsystem 640 typically include an Ethernet card, a modem (telephone, satellite, cable, ISDN), (asynchronous) digital subscriber line (DSL) unit, FireWire interface, USB interface, and the like. For example, the communications subsystem 640 may be coupled to the communications networks and other systems 655 (e.g., communications network 480), to a FireWire bus, or the like. In other embodiments, the communications subsystem 640 be physically integrated on the motherboard of computer system 600, may be a software program, such as soft DSL, or the like.

The RAM 650 and the file storage subsystem 625 are examples of tangible media configured to store data such as domain name information, embodiments of the present invention, including executable computer code, human readable code, or the like. Other types of tangible media include floppy disks, removable hard disks, optical storage media such as CD-ROMs, DVDs and bar codes, semiconductor memories such as flash memories, read-only-memories (ROMS), battery-backed volatile memories, networked storage devices, and the like.

In the present embodiment, computer system 600 may also include software that enables communications over a network (e.g., communications network 480 of FIG. 4) such as the DNS, TCP/IP, UDP/IP, and HTTP/HTTPS protocols, and the like. In alternative embodiments of the present invention, other communications software and transfer protocols may also be used, for example IPX, or the like.

It will be readily apparent to one of ordinary skill in the art that many other hardware and software configurations are suitable for use with the present invention. For example, computer system 600 may be a desktop, portable, rack-mounted, or tablet configuration. Additionally, computer system 600 may be a series of networked computers. Further, the use of other micro processors are contemplated, such as Pentium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g., a programmable logic device or graphics processor unit).

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method of domain name system (DNS) communication, the method comprising:
   receiving, at a first computer system, a request to resolve a domain name generated by a subscriber associated with an identifier, wherein the identifier identifies subscriber information for the subscriber that includes one or more user-controllable settings for resolving DNS queries;
   generating a DNS query based on the request that is encoded with the identifier so that a server resolving the DNS query can determine the one or more user-controllable settings for resolving DNS queries for the subscriber; and
   receiving a DNS response for the DNS query that includes an IP address for the request, as determined based on the domain name and the one or more user-controllable settings for the subscriber.

2. The method of claim 1, wherein the one or more user-controllable settings enable or disable options for resolving DNS queries.

3. The method of claim 2, wherein the one or more user-controllable settings include one or more preferences provided by the subscriber for resolving domain names into IP addresses using the options.

4. The method of claim 3, wherein the DNS response is generated using the options based on the domain name and the one or more user-controllable settings.

5. The method of claim 1, wherein the identifier is a subscriber identifier for the subscriber.

6. The method of claim 1, wherein the identifier includes index information that enables the server resolving the DNS query to retrieve the subscriber information.

7. The method of claim 1, wherein the DNS query is also encoded with one or more additional settings for resolving DNS queries.

8. The method of claim 1, wherein the IP address included in the DNS response does not correspond to the domain name when the user-controllable settings indicate that the domain name corresponds to a malicious or inappropriate IP address.

9. The method of claim 1, wherein the first computer system is a network device associated with a plurality of client devices.

10. A non-transitory computer-readable storage medium configured to store computer-readable code for programming a processor to resolve domain name system (DNS) queries, the computer-readable code comprising instructions to:
    receive a request to resolve a domain name generated by a subscriber associated with an identifier, wherein the identifier identifies subscriber information for the subscriber that includes one or more user-controllable settings for resolving DNS queries;
    generate a DNS query based on the request that is encoded with the identifier so that a server resolving the DNS query can determine the one or more user-controllable settings for resolving DNS queries for the subscriber; and
    receive a DNS response for the DNS query that includes an IP address for the request, as determined based on the domain name and the one or more user-controllable settings for the subscriber.

11. The non-transitory computer-readable storage medium of claim 10, wherein the one or more user-controllable settings include settings for a proxy option.

12. The non-transitory computer-readable storage medium of claim 10, wherein the identifier is a subscriber identifier for the subscriber.

13. The non-transitory computer-readable storage medium of claim 10, wherein the identifier includes index information that enables the server resolving the DNS query to retrieve the subscriber information.

14. A method for resolving domain name system (DNS) queries, the method comprising:
    receiving a request to resolve a domain name generated by a subscriber associated with an identifier, wherein the identifier identifies subscriber information for the subscriber that includes one or more user-controllable settings for resolving DNS queries;
    generating a DNS query based on the request that is encoded with the identifier so that a server resolving the DNS query can determine the one or more user-controllable settings for resolving DNS queries; and
    receiving a DNS response for the DNS query that includes an IP address for the request, as determined based on the domain name and the one or more user-controllable settings for the subscriber.

15. The method of claim 14, wherein the method further comprises:
    receiving the one or more user-controllable settings from the subscriber;
    receiving a plurality of additional requests to resolve a plurality of domain names into IP addresses; and
    generating a plurality of DNS queries based on the plurality of requests, each DNS query encoding the one or more user-controllable settings.

16. The method of claim 15, wherein the DNS query is also encoded with one or more additional settings for resolving DNS queries.

17. The method of claim 16, wherein the one or more user-controllable settings enable or disable options for resolving DNS queries.

18. A system for resolving domain name system (DNS) queries, the system comprising:
    a communications interface configured to receive DNS queries via a communication network;
    one or more storage devices maintaining a plurality of options for resolving DNS queries;

a processor configured to:
- receive a DNS query via the communications interface, the DNS query including control information that encodes one or more user-controllable settings for one or more of the plurality of options for resolving DNS queries;
- parse a domain name and the control information from the DNS query;
- determine an IP address using the one or more of the plurality of options based on the domain name and the one or more user-controllable settings; and
- generate a DNS response for the DNS query using the IP address.

19. The system of claim 18, wherein the IP address used to generate the DNS response is different from an IP address associated with the domain name.

20. The system of claim 18, wherein the processor is configured to enable or disable the one or more of the plurality of options for resolving DNS queries using the one or more settings.

* * * * *